United States Patent
Kim et al.

(10) Patent No.: US 7,931,949 B2
(45) Date of Patent: *Apr. 26, 2011

(54) BIODEGRADABLE STARCH BOWL AND METHOD FOR PREPARING THE SAME

(75) Inventors: Heon Moo Kim, Kwangmyeong-si (KR); Sung-Arn Lee, Ansan-si (KR); Kang-Soo Kim, Ansan-si (KR); Jun-Seung An, Ansan-si (KR); Young-Hee Kim, Ansan-si (KR)

(73) Assignee: Youl Chon Chemical Co., Ltd., Seoul (KR)

( * ) Notice: Subject to any disclaimer, the term of this patent is extended or adjusted under 35 U.S.C. 154(b) by 443 days.

This patent is subject to a terminal disclaimer.

(21) Appl. No.: 10/580,102

(22) PCT Filed: Jan. 26, 2005

(86) PCT No.: PCT/KR2005/000217
§ 371 (c)(1),
(2), (4) Date: May 19, 2006

(87) PCT Pub. No.: WO2006/006761
PCT Pub. Date: Jan. 19, 2006

(65) Prior Publication Data
US 2007/0071918 A1 Mar. 29, 2007

(30) Foreign Application Priority Data

Jul. 9, 2004 (KR) .................. 10-2004-0053629

(51) Int. Cl.
*B32B 1/00* (2006.01)
*B05D 7/22* (2006.01)

(52) U.S. Cl. ............................ 428/35.7; 427/238
(58) Field of Classification Search ............... 428/34.1, 428/35.7, 323; 220/574.3; 264/511; 427/238
See application file for complete search history.

(56) References Cited

U.S. PATENT DOCUMENTS

| | | | | |
|---|---|---|---|---|
| 2,137,169 A | * | 11/1938 | Levey | 604/304 |
| 3,954,104 A | * | 5/1976 | Kraskin et al. | 604/15 |
| 5,382,440 A | * | 1/1995 | Sullivan | 426/138 |

(Continued)

FOREIGN PATENT DOCUMENTS

| | | |
|---|---|---|
| CN | 1335114 | 2/2002 |
| JP | 8-157645 | 6/1996 |
| JP | 11-171238 | 6/1999 |
| JP | 11-279319 | 10/1999 |

(Continued)

OTHER PUBLICATIONS

Translated Abstract for Kr 2002028272A Kim et al, Apr. 2002.*

*Primary Examiner* — Rena L Dye
*Assistant Examiner* — Erik Kashnikow
(74) *Attorney, Agent, or Firm* — Sughrue Mion, PLLC

(57) ABSTRACT

Disclosed is a biodegradable starch bowl prepared by heating and pressurizing a composition for the biodegradable starch bowl comprising unmodified starch of 20~60 wt. %; pulp fiber powder of 5~30 wt. %; solvent of 30~60 wt. %; photo catalyst of 0.1~2.0 wt. %; preservative of 0.01~1 wt. %; and releasing agent of 0.5~5 wt. % to have a desired shape, and a biodegradable film being attached on the inner surface of the bowl. The biodegradable starch bowl according to the present invention has an improved sterilizing property, deodorizing property, preservative property, releasing property, water-resistance and strength.

21 Claims, 7 Drawing Sheets

U.S. PATENT DOCUMENTS

| | | | | |
|---|---|---|---|---|
| 5,512,378 | A | * | 4/1996 | Bastioli et al. ............. 428/484.1 |
| 5,525,281 | A | * | 6/1996 | Lorcks et al. ................. 264/101 |
| 5,786,408 | A | * | 7/1998 | Kuroda et al. ................ 523/124 |
| 6,030,673 | A | * | 2/2000 | Andersen et al. ............ 428/36.4 |
| 6,117,229 | A | * | 9/2000 | Cassar et al. .................. 106/724 |
| 6,146,573 | A | * | 11/2000 | Shogren et al. ............... 264/241 |
| 6,183,596 | B1 | * | 2/2001 | Matsuda et al. .................. 162/9 |
| 2002/0160910 | A1 | * | 10/2002 | Sanbayashi et al. .......... 502/208 |

FOREIGN PATENT DOCUMENTS

| | | |
|---|---|---|
| JP | 11-279322 | 10/1999 |
| JP | 2001-0103845 A | 4/2001 |
| KR | 10-2004-0053644 | 6/2004 |
| KR | 2004-0053644 A | 6/2004 |
| KR | 20-0366379 Y | 10/2004 |
| WO | WO 2006/014054 A1 | 2/2006 |

* cited by examiner

[Fig. 1]
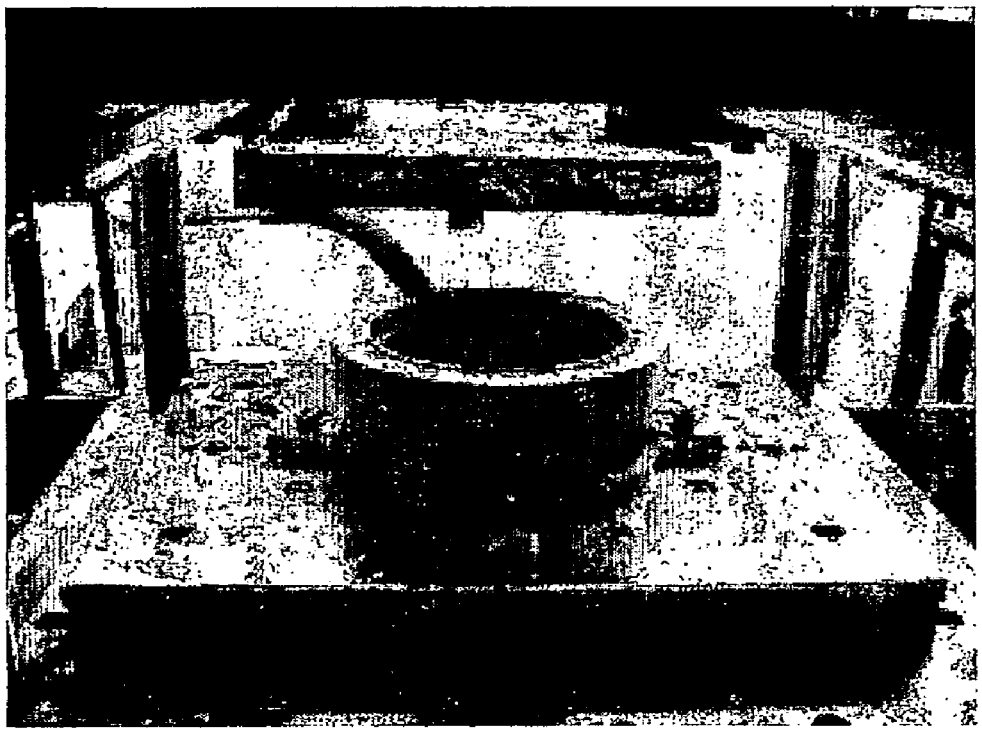
[Fig. 2]
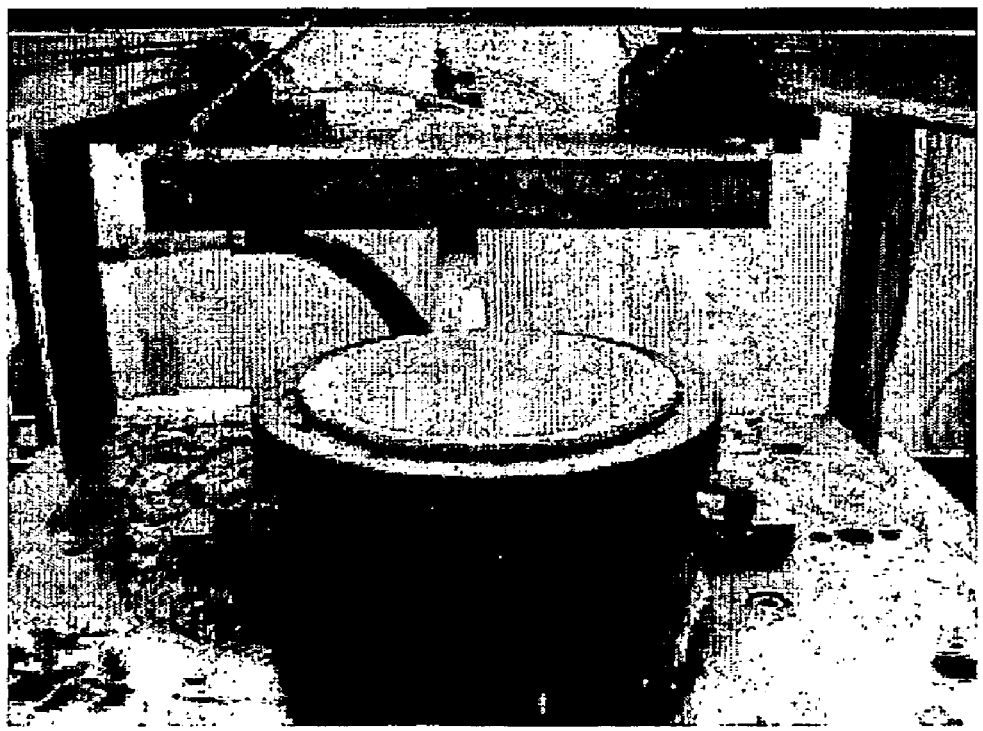

[Fig. 3]
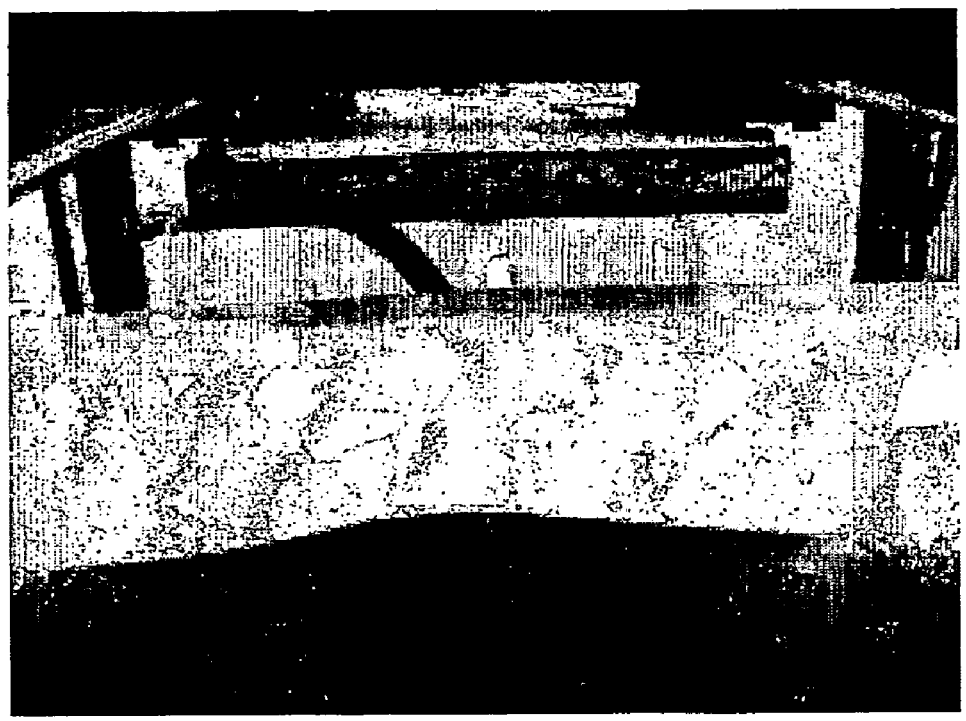
[Fig. 4]
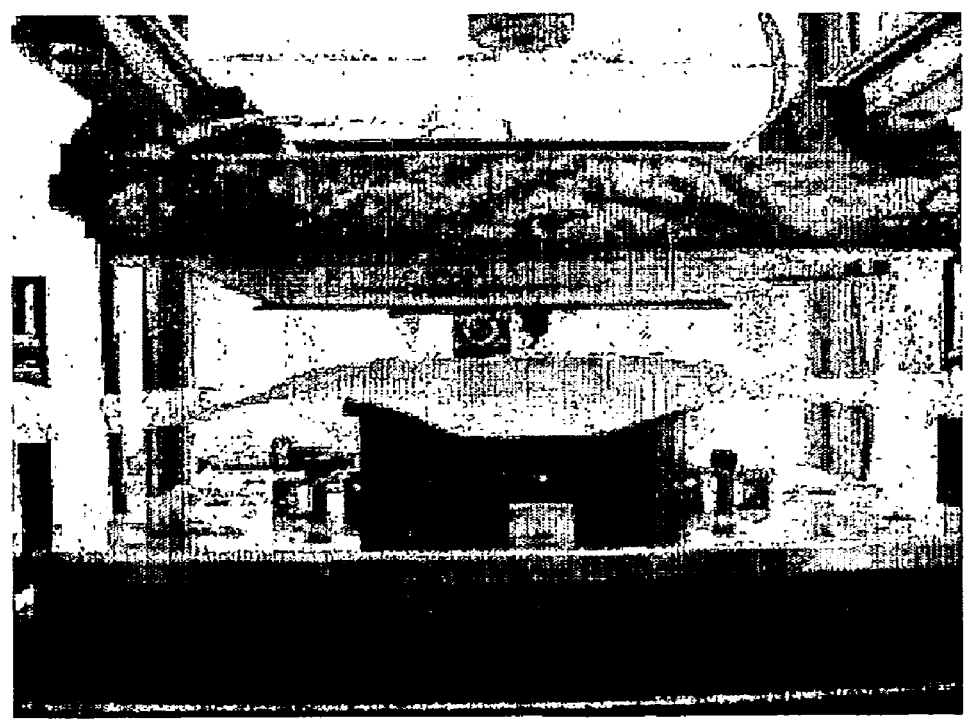

[Fig. 5]
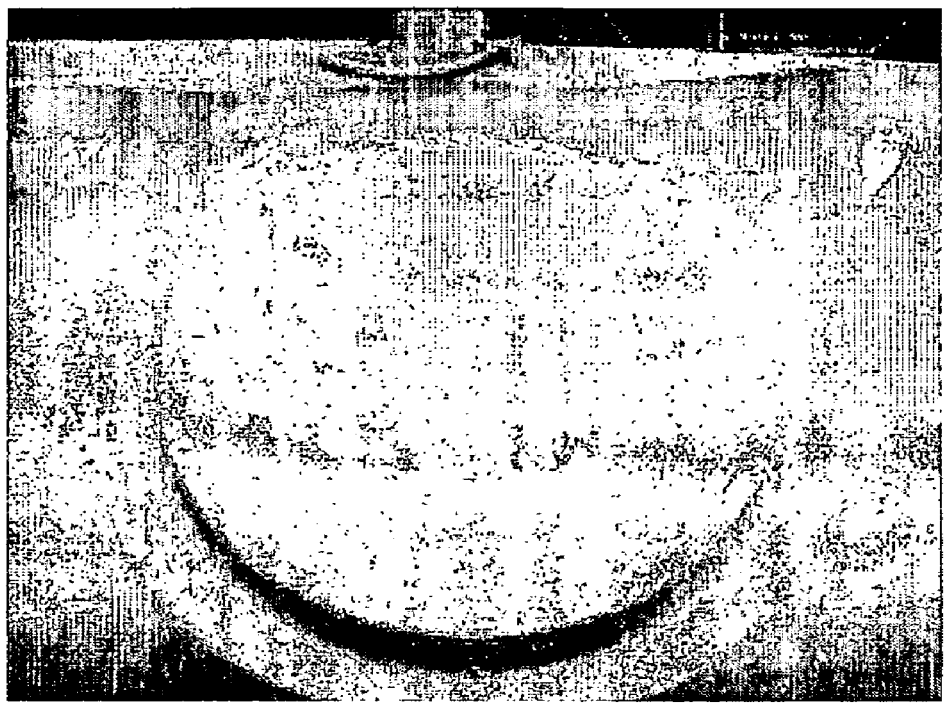
[Fig. 6]
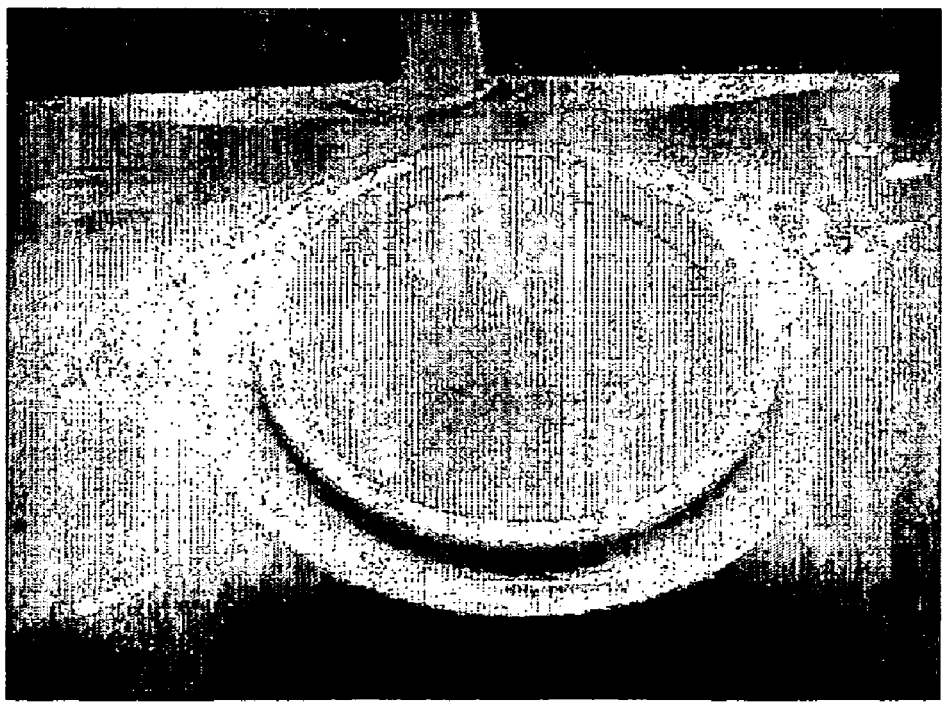

【Fig. 7】
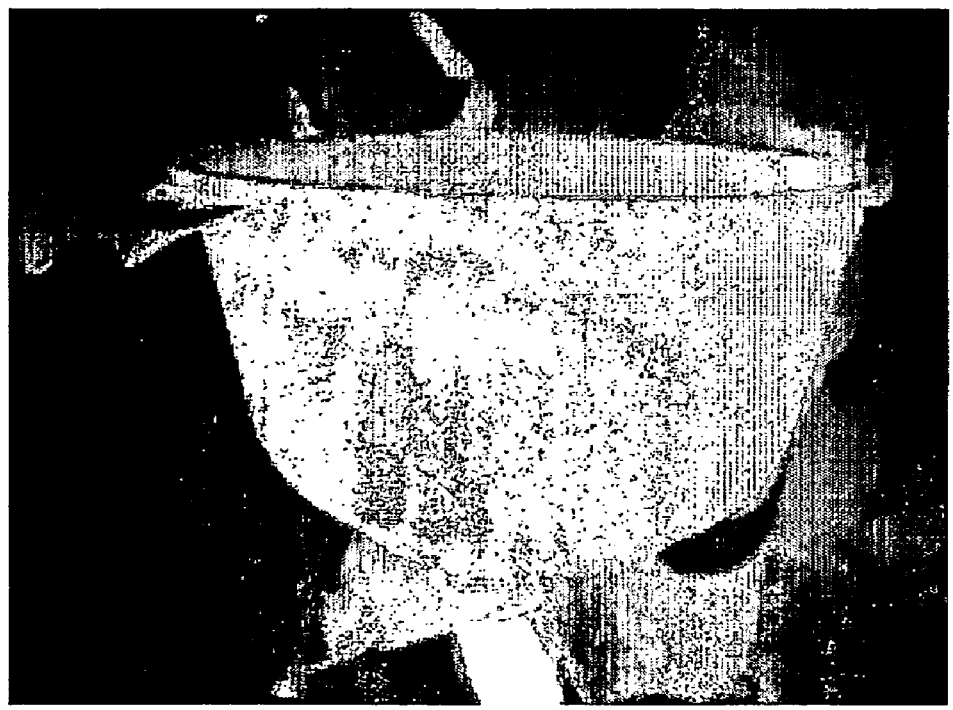
【Fig. 8】
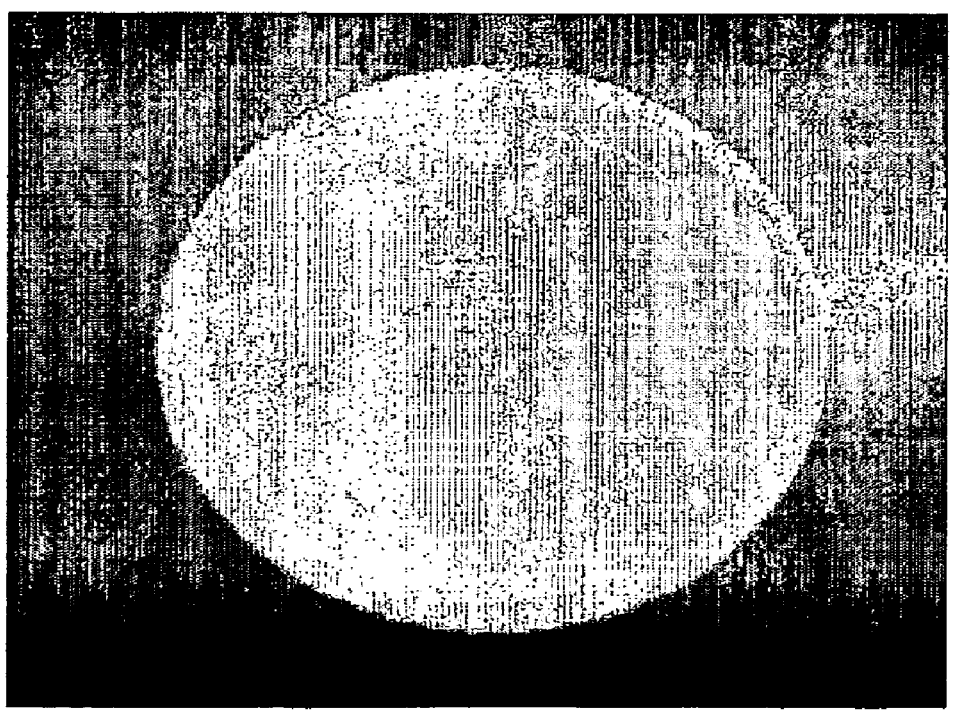

[Fig. 9]
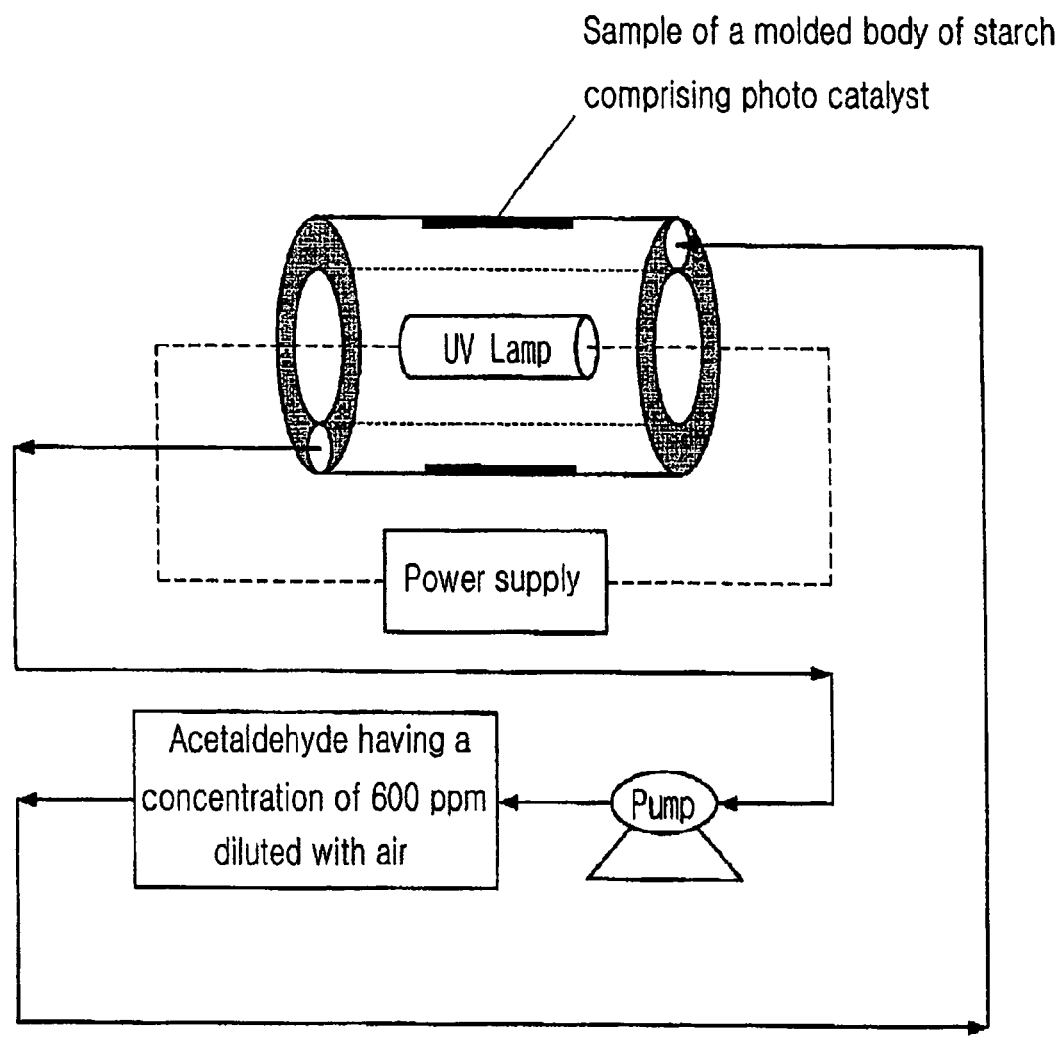

[Fig. 10]
[Fig. 11]

[Fig. 12]
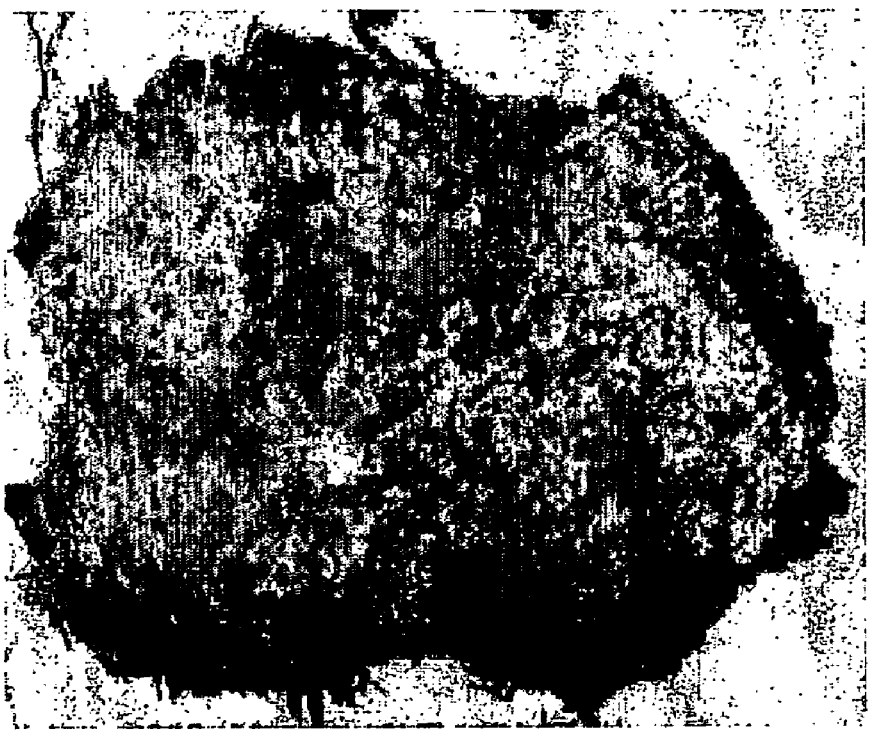
[Fig. 13]
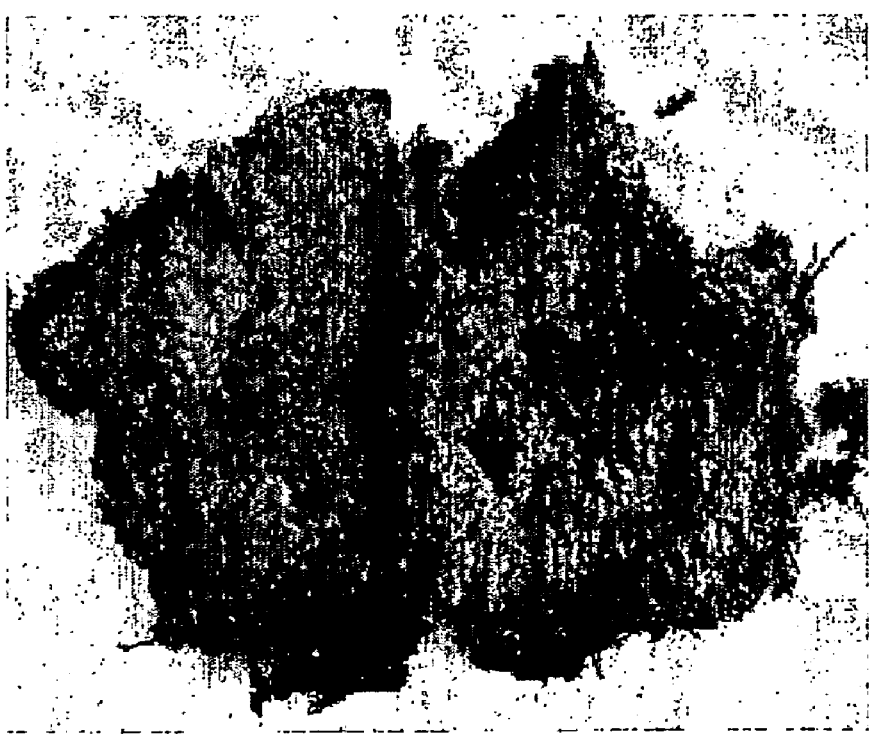

US 7,931,949 B2

BIODEGRADABLE STARCH BOWL AND METHOD FOR PREPARING THE SAME

This is a national stage application under 35 U.S.C. §371 of PCT/KR2005/000217 filed on Jan. 26, 2005, which claims priority from Korean patent application 10-2004-0053629 filed on Jul. 9, 2004, all of which are incorporated herein by reference.

TECHNICAL FIELD

The present invention relates to a biodegradable starch bowl having improved sterilizing property, deodorizing property, preservative property, releasing property, water-resistance and strength, and a method for preparing the same.

BACKGROUND ART

In order to improve environmental pollutions due to disposable bowl made of foamable synthetic resin, plastics and aluminum foil, etc., there have been studies on biodegradable disposable bowl consisting of natural polymers such as paper and starch, etc. which can be decomposed after filled in ground.

Since said disposable bowl is biodegradable contrary to such disposable bowl made of synthetic resins etc., it does not cause environmental pollutions and can be easily processed.

However, an inner or outer part of the biodegradable disposable bowl can be polluted with pathogenic *Escherichia coli*, O-157, pseudomonas aeruginosa, staphylococcus and salmonella, etc. In addition, since the biodegradable disposable bowl can be decomposed by microorganism, it has a very weak preservative property. Also, the biodegradable disposable bowl has a poor impact-resistance compared to that of the prior plastic bowl. Further, the biodegradable disposable bowl has a poor water-resistance and therefore there is such a problem that it is very easy for water to penetrate into the biodegradable disposable bowl.

Accordingly, there were known several techniques for adding the water-resistance, impact-resistance, antibiosis and preservative property, etc. to the biodegradable disposable bowl. The examples are as follow.

Japanese Patent Publication No. Hei 8-311243 discloses a biodegradable foamable composition having improved antibiosis, antifungal property, impact-resistance and water-resistance, which is made by combining starch based polymers, vegetable fibers, metal ions, foaming agent and aliphatic polyester.

Japanese Patent Publication No. Hei 7-97545 discloses that a surface of tray for food made of starch based biodegradable materials deficient in water-resistance is coated with a coating agent having poly L-lactic acid, which is a biodegradable aliphatic polyester, dissolved in CFC 123, which is a halogenated hydrocarbon, thereby improving water-resistance of the surface of the tray.

U.S. Pat. No. 6,361,827 discloses a method for providing water-resistance by a chemical bonding of prolamin such as zein to a surface of polysaccharide molded body.

However, the prior methods for preparing a biodegradable disposable bowl still have such problems that the bowls have poor long-term preservative property and therefore become decomposed due to microorganism etc. particularly when they are used for storing foods. Further, they have problems of being deficient in sterilizing and deodorizing properties and having poor water-resistance, which is particularly required for a disposable bowl for instant noodles.

Also, when an additive is added to a biodegradable composition additionally for improving the water-resistance, it is necessary to regulate a content of the additive. If the content is not properly regulated, it is difficult to easily achieve a desired property such as an overall strength, preservative property, sterilizing property and deodorizing property.

On the other hand, the biodegradable disposal bowl has a low production efficiency due to its poor releasing property.

That is, when preparing the biodegradable disposable bowl, the bowl is not easily released from a mold in case that a depth of the bowl is 5 cm or more. As a result, it is required to manually release the bowl one by one from the mold after discontinuing the preparing process, which lower the production efficiency.

DISCLOSURE

Technical Problem

Accordingly, the present invention has been made to solve the above-mentioned problems occurring in the prior art. The object of the present invention is to provide a biodegradable starch bowl having improved sterilizing property, deodorizing property, preservative property, releasing property, water-resistance and strength.

Technical Solution

The biodegradable starch bowl according to the present invention is characterized by being prepared to have a desired shape by heating and pressurizing a composition for the biodegradable starch bowl comprising unmodified starch of 20~60 wt. %; pulp fiber powder of 5~30 wt. %; solvent of 30~60 wt. %; photo catalyst of 0.1~2.0 wt. %; preservative of 0.01~1 wt. %; and releasing agent of 0.5~5 wt. %, and a biodegradable film being attached to an inner surface of the bowl.

The method for preparing the biodegradable starch bowl according to the present invention is characterized by comprising steps of preparing a composition for a biodegradable starch bowl comprising unmodified starch of 20~60 wt. %; pulp fiber powder of 5~30 wt. %; solvent of 30~60 wt. %; photo catalyst of 0.1~2.0 wt. %; preservative of 0.01~1 wt. %; and releasing agent of 0.5~5 wt. % (S1); preparing a bowl having a desired shape by heating and pressurizing the composition (S2); heating a biodegradable film so as to be softened (S3); and positioning the softened film on an upper part of the bowl and then pressurizing the film into the bowl with vacuum suction or air injection from an exterior, thereby attaching the film to an inner surface of the bowl (S4).

The unmodified starch is characterized by being one or more selected from a group consisting of corn, potato, wheat, rice, tapioca and sweet potato.

The pulp fiber powder is characterized by having a fiber length of 10~200 μm. Further, the pulp fiber powder is characterized by being made by crushing a broadleaf tree.

The photo catalyst is characterized by being a titanium dioxide wherein an anatase content is 70% or more. Also, the photo catalyst is characterized by being a titanium dioxide doped with one or more selected from a group consisting of $Fe(III)(Fe^{3+})$, vanadium (V), molybdenum (Mo), niobium (Nb) and platinum (Pt). Further, the photo catalyst is characterized by being a titanium dioxide doped with $Fe(III)(Fe^{3+})$. Furthermore, the photo catalyst is characterized by being a titanium dioxide added with one or more selected from metal oxides group consisting of silicon dioxide, vanadic pentoxide and tungsten oxide.

The preservative is characterized by being one or more selected from a group consisting of sorbate, potassium sorbate, sodium benzoate and sodium propionate.

The releasing agent is characterized by being one or more selected from a group consisting of monostearyl citrate and magnesium stearate. Further, the releasing agent is characterized by being a mixture of monostearyl citrate and magnesium stearate having the mixing ratio of 1:1.5 by weight.

The solvent is characterized by being one or more selected from a group consisting of water, alcohol, alkaline aqueous solution and acidic aqueous solution. Further, the solvent is characterized by being water.

The biodegradable film is characterized by being made of one or more selected from a group consisting of polylactic acid, polycaprolactone, polybutylene succinate, polyethylene succinate, polyvinyl alcohol, polyglycolic acid, ester starch and cellulose acetate.

The biodegradable film is characterized by having a thickness of 100~300 μm.

The step of S4 is characterized by being performed so that the film is pressurized into the bowl with the air injection from an exterior and the vacuum-suction at the same time and thereby the film is attached to the inner surface of the bowl.

Advantageous Effects

The biodegradable starch bowl prepared according to the present invention has improved sterilizing property, deodorizing property, preservative property, releasing property, water-resistance and strength.

DESCRIPTION OF DRAWINGS

FIG. 1 is a photograph showing a mold cavity having air vent holes used in an example of the invention.

FIG. 2 is a photograph showing the bowl prepared using the composition of the invention positioned in the mold cavity having air vent holes in the example of the invention.

FIG. 3 is a photograph showing a procedure of delivering a film to a heater section in the example of the invention.

FIG. 4 is a photograph showing a procedure of heating the film so as to be softened in the example of the invention.

FIG. 5 is a photograph showing a vacuum suction procedure in the example of the invention.

FIG. 6 is a photograph showing a step wherein a vacuum suction is finished in the example of the invention.

FIG. 7 is a photograph showing a procedure of cutting a film around the bowl in the example of the invention.

FIG. 8 is a photograph showing a biodegradable starch bowl in the example of the invention.

FIG. 9 is a schematic view showing an apparatus for measuring sterilizing and deodorizing effects in the experiment 1 of the invention.

FIG. 10 is a photograph showing a bowl at an early stage of degradation in an experiment 2 of the invention.

FIG. 11 is a photograph showing the bowl degraded after 20 days in the experiment 2 of the invention.

FIG. 12 is a photograph showing the bowl degraded after 40 days in the experiment 2 of the invention.

FIG. 13 is a photograph showing the bowl degraded after 100 days in the experiment 2 of the invention.

MODE FOR INVENTION

A composition for a biodegradable starch bowl according to the invention comprises starch, particularly unmodified starch, pulp fiber powder for reinforcing a tensile strength and a bend resistance, water as a solvent, a photo catalyst for sterilizing and deodorizing effect, a preservative for improving a preservative property and a releasing agent for increasing a releasing property.

Further, it is preferred that the composition comprises the unmodified starch of 20~60 wt. %, the pulp fiber powder of 5~30 wt. %, the solvent of 30~60 wt. %, the photo catalyst of 0.1~2.0 wt. %, the preservative of 0.01~1 wt. % and the releasing agent of 0.5~5 wt. %.

Specifically, anion natural starch, i.e., unmodified starch is used as the biodegradable starch. By using the unmodified starch which is not physically and chemically processed, it becomes possible to relatively simplify a preparing process and to reduce a production cost.

It is possible to use corn, glutinous corn, potato, tapioca, sweet potato, rice, glutinous rice, wheat, barley, and other seeds, etc. having 40% or less of an amylose as the unmodified starch. In particular, it is preferred to use at least one selected from a group consisting of corn, potato, wheat, rice, tapioca and sweet potato.

It is preferred that the content of the unmodified starch is 20~60 wt. % based on a total composition. When the content is less than 20 wt. %, it is difficult to uniformly disperse the pulp and various additives due to the deficiency of starch serving as an organic binder. When the content is more than 60 wt. %, there exist problems that the impact strength and water-resistance are deteriorated.

Next, the pulp fiber powder is included.

Since the unmodified starch typically has anion charges of 500 meq or more, there exists a tendency that the unmodified starch lumps together with each other. Accordingly, a bonding energy between the molecules becomes weak so that overall strength and water-resistance are decreased.

Therefore, in order to prevent such problems, used is a fine pulp fiber which is fine-powdered by crushing the pulp with a pulverizer. When using the fine pulp fiber, an apparent density can be increased. Further, a volume and a tendency to lump together can be decreased. To this end, it is possible to increase the overall strength such as a tensile strength and a bend resistance.

It is possible to use one or more selected from a group consisting of wood, straw, sugarcane, reed, bamboo, woody trunk, phloem fiber, leaf fiber and seedling fiber, as the pulp fiber.

Further, it is preferred to use the pulp fiber having a length of 10~200 μm so as to increase a dispersibility of the fiber powders in the composition and to maintain a strength of the molded body to be constant according to parts of the molded body.

When a broadleaf tree, i.e., a long fiber and a needle-leaf tree, i.e., a short fiber are used among the pulp fibers, there is a difference between the amounts of distribution according to the lengths of the fibers to be crushed even in the case of using a screen having a same size.

Table 1 shows the distribution of the fiber lengths in the case of crushing the broadleaf tree through a screen having a hole of 0.35 mm (apparent volume density of the fiber: 30~50 g/l).

TABLE 1

| Fiber length (μm) | Amount of distribution |
| --- | --- |
| less than 32 | 18% |
| 32~50 | 11% |
| 50~90 | 18% |
| 90~150 | 28% |

TABLE 1-continued

| Fiber length (μm) | Amount of distribution |
|---|---|
| 150~200 | 23% |
| more than 200 | 2% |

Table 2 shows the distribution of the fiber lengths in the case of crushing the needle-leaf tree through a screen having a hole of 0.35 mm (apparent volume density of the fiber: 70~90 g/l).

TABLE 2

| Fiber length (μm) | Amount of distribution |
|---|---|
| less than 32 | 12% |
| 32~50 | 16% |
| 50~90 | 29% |
| 90~150 | 35% |
| 150~200 | 6% |
| more than 200 | 2% |

As can be seen from Tables 1 and 2, the reason that the lengths of the pulp fibers crushed are variously distributed is why the long fibers can be folded or twisted when passing through the holes (0.35 mm) of the screen. Although it is possible to regulate the distribution of the fiber lengths by adjusting a size of the screen hole, there are still diverse distributions even in the case of the regulation.

According to the invention, it is preferred to use the broadleaf tree pulp having a relatively excellent heat-resistance rather than the needle-leaf tree. If the pulp powders made by crushing the needle-leaf tree are used, they are carbonized due to the heat during a molding, thereby causing a color-change to a final product.

Next, it is desirable to use water as a solvent in an amount of 30~60 wt. %. Further, alcohol, alkaline aqueous solution and acidic aqueous solution as well as water can be used as the solvent.

Next, the photo catalyst is mixed for sterilizing or deodorizing effect. A titanium dioxide doped with a metal such as an Fe(III)($Fe^{3+}$), vanadium (V), molybdenum (Mo), niobium (Nb) and platinum (Pt), etc. may be used as the photo catalyst. Further, a titanium dioxide added with one or more of metal oxides such as silicon dioxide ($SiO_2$), vanadic pentoxide ($V_2O_5$) and tungsten oxide ($WO_3$), etc. may be used for the photo catalyst.

In particular, it is desirable to use a titanium dioxide wherein an anatase content is 70% or more, with a view point to increase the sterilizing and deodorizing effect.

Specifically, the titanium dioxide is classified into three types of rutile, anatase and vrookite according to crystal structure. The titanium dioxide wherein an anatase content is 70% means that titanium dioxide comprises an anatase crystal structure by 70% and the remaining 30% consists of a rutile-type titanium dioxide as a major element and a vrookite-type titanium dioxide as a very minor element. Since the anatase-type exhibits a high activity in a photo catalyst reaction, the titanium dioxide wherein an anatase content is 70% or more can provide sufficient sterilizing and deodorizing effect.

It is preferred that the photo catalyst is contained in an amount of 0.1~2.0 wt. %. When adding the photo catalyst beyond the range, the molding property and strength of the bowl may be lowered. When adding the photo catalyst too little, it is difficult to exhibit the sterilizing and deodorizing effects.

Next, it is preferred to use one or more selected from a group consisting of sorbate, potassium sorbate, sodium benzoate and sodium propionate in an amount of 0.01~1 wt. %, as the preservative.

Next, it is preferred to use one or more selected from a group consisting of monostearyl citrate and magnesium stearate in an amount of 0.5~5 wt. %, as the releasing agent.

When preparing a starch bowl using the composition as described above, a biodegradable disposable bowl can be produced by means of molding the mixed composition into the bowl in a heating and pressurizing mold heated to 140~220° C. at a pressure of 0.5~8 kgf/cm² for 1~5 minutes.

According to the invention, in order to easily obtain a water-resistance and to reinforce a strength of the bowl during the preparing process of the bowl produced as described above, a laminating method of a biodegradable film to the bowl is used.

FIG. 1 is a photograph showing a mold cavity having air vent holes, which is applied in examples of the method of the invention. FIG. 2 is a photograph showing the prepared bowl positioned in the mold cavity having air vent holes.

That is, the composition is prepared as described above (S1). Then, a bowl is provided by molding the composition into the bowl having a shape (S2). Then, the bowl is positioned in the mold cavity having air vent holes as shown in FIGS. 1 and 2.

FIG. 3 is a photograph showing a procedure of delivering a prepared biodegradable film to a heater section. FIG. 4 is a photograph showing a procedure of heating the film so as to be softened.

As shown in FIGS. 3 and 4, after the step of S2, the biodegradable film is delivered to the heater section, which has been heated to 80~250° C. in advance, and then heated for 1~10 seconds so as to be softened (S3).

Herein, it is possible to use one or more of commercial polymers having a biodegradability such as polylactic acid, polycaprolactone, polybutylene succinate, polyethylene succinate, polyvinyl alcohol, polyglycolic acid, ester starch and cellulose acetate, etc. as the biodegradable film.

FIG. 5 is a photograph showing a vacuum suction procedure through the air vent holes of the mold cavity. FIG. 6 is a photograph showing a step wherein a vacuum suction is finished.

As shown in FIGS. 5 and 6, the softened film is positioned on an upper part of the bowl and then is vacuum-sucked with 150~600 mmHg vacuum for 0.5~10 seconds through the air vent holes of the mold cavity, so that it is closely attached to an inner surface of the bowl (S4).

On the other hand, the film may be attached to the bowl by film lamination using a pressurized air injection rather than the vacuum suction.

That is, as described above, the bowl is positioned in the mold cavity having the air vent holes and the film is then delivered to the heater section, which has been heated to 80~250° C. in advance, and then heated for 1~10 seconds so as to be softened. Then, the softened film is positioned in the upper part of the bowl and then pressurized onto the bowl with the injection of air having 1~4 kgf/cm² of pressure for 0.2~3 seconds through an air injector from an exterior, so that it is closely attached to the inner surface of the bowl (S4).

In addition, the film lamination using the vacuum suction and the pressurized air injection together is possible.

That is, as described above, the bowl is positioned in the mold cavity having the air vent holes and the film is then delivered to the heater section, which has been heated to 80~250° C. in advance, and then heated for 1~10 seconds so as to be softened. Then, the softened film is positioned in the upper part of the bowl, then pressurized onto the inner surface of the bowl with the injection of air having 1~4 kgf/cm² of pressure for 0.2~3 seconds through an air injector from an exterior, and simultaneously vacuum-sucked with 150~600 mmHg vacuum for 0.1~5 seconds through the air vent holes of the mold cavity, so that it is closely attached to the inner surface of the bowl (S4).

According to the method of the film lamination using the vacuum suction and the pressurized air injection together, it is possible to reduce a lamination time and to increase a production efficiency of the starch bowl and to enhance an attaching strength between the film and the bowl.

FIG. 7 is a photograph showing a procedure of cutting a film around the bowl having the film attached to the inner surface thereof. FIG. 8 is a photograph showing a biodegradable starch bowl according to the invention.

As shown in FIG. 7, the film around a lip part of the bowl is cut. To this end, as shown in FIG. 8, obtained is a biodegradable starch bowl having the biodegradable film attached on the inner surface thereof, which is capable of improving the water-resistance and reinforcing a strength of the bowl.

The biodegradable starch bowl prepared as described above can be easily provided with the water-resistance in a step after molding without an additional additive for improving the water-resistance. Further, since the film is attached on the inner surface of the bowl, it is possible to efficiently obtain water-resistance and to reinforce the strength of the bowl compared to the addition of the additive.

Hereinafter, the present invention will be described in detail by describing examples and experiments using the examples. However, the present invention is not limited to the following examples and several examples can be realized in the scope of the accompanying claims. The following examples are provided just for making the perfect disclosure of the invention and also helping those having ordinary skill in the art to carry out the invention easily.

Examples 1 to 4

Preparation of Compositions for Biodegradable Starch Bowl

Examples 1 to 4 were prepared as follow:

Unmodified anion corn starch, fiber powder obtained from a broadleaf tree, titanium dioxide wherein an anatase content is 70% or more as a photo catalyst, a mixture of magnesium stearate and monostearyl citrate as a releasing agent, and potassium sorbate as a long-term preservative and water were mixed according to Table 3 in a double jacket heating agitator for 20 minutes, thereby providing compositions for molding.

Table 3 shows each composition of the examples 1 to 4.

TABLE 3

| Constituents | Example 1 | Example 2 | Example 3 | Example 4 |
|---|---|---|---|---|
| Natural polymer (corn starch) | 36.7 | 36.7 | 36.7 | 36.7 |
| Pulp fiber powder (broadleaf tree) | 9.9 | 9.9 | 9.9 | 9.9 |
| TiO₂ wherein an anatase content is 70% or more | 0.2 | 0.5 | 1 | 2 |
| Preservative (potassium sorbate) | 0.2 | 0.2 | 0.2 | 0.2 |
| Releasing agent (Mg stearate) | 0.8 | 0.8 | 0.8 | 0.8 |

TABLE 3-continued

| Constituents | Example 1 | Example 2 | Example 3 | Example 4 |
|---|---|---|---|---|
| Releasing agent (monostearyl citrate) | 1.2 | 1.2 | 1.2 | 1.2 |
| Water | 51.0 | 50.7 | 50.2 | 49.2 |
| Total | 100 | 100 | 100 | 100 |

Examples 5 to 8

Preparation of Compositions for Biodegradable Starch Bowl

In these examples 5 to 8, biodegradable compositions were prepared in the same manners and amounts as the examples 1 to 4 except that titanium dioxide doped with Fe(III)(Fe$^{3+}$) (i.e., Fe$^{3+}$-doped TiO$_2$) was used as the photo catalyst.

Table 4 shows each composition of the examples 5 to 8.

TABLE 4

| Constituents | Example 5 | Example 6 | Example 7 | Example 8 |
|---|---|---|---|---|
| Natural polymer (corn starch) | 36.7 | 36.7 | 36.7 | 36.7 |
| Pulp fiber powder (broadleaf tree) | 9.9 | 9.9 | 9.9 | 9.9 |
| Fe$^{3+}$-doped TiO$_2$ | 0.2 | 0.5 | 1 | 2 |
| Preservative (potassium sorbate) | 0.2 | 0.2 | 0.2 | 0.2 |
| Releasing agent (Mg stearate) | 0.8 | 0.8 | 0.8 | 0.8 |
| Releasing agent (monostearyl citrate) | 1.2 | 1.2 | 1.2 | 1.2 |
| Water | 51.0 | 50.7 | 50.2 | 49.2 |
| Total | 100 | 100 | 100 | 100 |

Examples 9 to 12

Preparation of Composition for a Biodegradable Starch Bowl

In these examples 9 to 12, biodegradable compositions were prepared in the same manners and amounts as the examples 1 to 4 except that amounts of the photo catalyst, preservative and water were different from those of the examples 1 to 4.

Table 5 shows each composition of the examples 9 to 12.

TABLE 5

| Constituents | Example 9 | Example 10 | Example 11 | Example 12 |
|---|---|---|---|---|
| Natural polymer (corn starch) | 36.7 | 36.7 | 36.7 | 36.7 |
| Pulp fiber powder (broadleaf tree) | 9.9 | 9.9 | 9.9 | 9.9 |
| TiO$_2$ wherein an anatase content is 70% or more | 0.5 | 0.5 | 0.5 | 0.5 |
| Preservative (potassium sorbate) | 0.05 | 0.1 | 0.5 | 1.0 |

TABLE 5-continued

| Constituents | Example 9 | Example 10 | Example 11 | Example 12 |
|---|---|---|---|---|
| Releasing agent (Mg stearate) | 0.8 | 0.8 | 0.8 | 0.8 |
| Releasing agent (monostearyl citrate) | 1.2 | 1.2 | 1.2 | 1.2 |
| Water | 50.85 | 50.8 | 50.4 | 49.9 |
| Total | 100 | 100 | 100 | 100 |

Examples 13 to 16

Preparation of Composition for a Biodegradable Starch Bowl

In these examples 13 to 16, biodegradable compositions were prepared in the same manners and amounts as the examples 1 to 4 except that amounts of the photo catalyst, releasing agent of magnesium stearate and monostearyl citrate, and water were different from those of the examples 1 to 4.

Table 6 shows each composition of the examples 13 to 16.

TABLE 6

| Constituents | Example 13 | Example 14 | Example 15 | Example 16 |
|---|---|---|---|---|
| Natural polymer (corn starch) | 36.7 | 36.7 | 36.7 | 36.7 |
| Pulp fiber powder (broadleaf tree) | 9.9 | 9.9 | 9.9 | 9.9 |
| $TiO_2$ wherein an anatase content is 70% or more | 0.5 | 0.5 | 0.5 | 0.5 |
| Preservative (potassium sorbate) | 0.2 | 0.2 | 0.2 | 0.2 |
| Releasing agent (Mg stearate) | 1.6 | 1.4 | 0.8 | 0.4 |
| Releasing agent (monostearyl citrate) | 0.4 | 0.6 | 1.2 | 1.6 |
| Water | 50.7 | 50.7 | 50.7 | 50.7 |
| Total | 100 | 100 | 100 | 100 |

Comparative Examples 17 to 20

Preparation of Composition for a Biodegradable Starch Bowl

In these comparative examples 17 to 20, rutile phase titanium dioxide was used as the photo catalyst in order to compare $TiO_2$ wherein an anatase content is 70% or more or $Fe^{3+}$-doped $TiO_2$ as the photo catalyst. Biodegradable compositions were prepared in the same manners and amounts as the examples 1 to 4 except that the rutile phase titanium dioxide was used as the photo catalyst.

Table 7 shows each composition of the comparative examples 17 to 20.

TABLE 7

| Constituents | Comparative example 17 | Comparative example 18 | Comparative example 19 | Comparative example 20 |
|---|---|---|---|---|
| Natural polymer (corn starches) | 36.7 | 36.7 | 36.7 | 36.7 |
| Pulp fiber powder (broadleaf tree) | 9.9 | 9.9 | 9.9 | 9.9 |
| Rutile phase $TiO_2$ | 0.2 | 0.5 | 1 | 2 |
| Preservative (potassium sorbate) | 0.2 | 0.2 | 0.2 | 0.2 |
| Releasing agent (Mg stearate) | 0.8 | 0.8 | 0.8 | 0.8 |
| Releasing agent (monostearyl citrate) | 1.2 | 1.2 | 1.2 | 1.2 |
| Water | 51.0 | 50.7 | 50.2 | 49.2 |
| Total | 100 | 100 | 100 | 100 |

Comparative Examples 21 to 24

Preparation of Composition for a Biodegradable Starch Bowl

In these comparative examples 21 to 24, biodegradable compositions were prepared in the same manners and amounts as the comparative examples 17 to 20 except that sodium benzoate was used as the preservative, and amounts of the photo catalyst, preservative and water were different from those of the comparative examples 17 to 20.

Table 8 shows each composition of the comparative examples 21 to 24.

TABLE 8

| Constituents | Comparative example 21 | Comparative example 22 | Comparative example 23 | Comparative example 24 |
|---|---|---|---|---|
| Natural polymer (corn starch) | 36.7 | 36.7 | 36.7 | 36.7 |
| Pulp fiber powder (broadleaf tree) | 9.9 | 9.9 | 9.9 | 9.9 |
| Rutile phase $TiO_2$ | 0.5 | 0.5 | 0.5 | 0.5 |
| Preservative (sodium benzoate) | — | 0.1 | 0.2 | 0.5 |
| Releasing agent (Mg stearate) | 0.8 | 0.8 | 0.8 | 0.8 |
| Releasing agent (monostearyl citrate) | 1.2 | 1.2 | 1.2 | 1.2 |
| Water | 50.9 | 50.8 | 50.7 | 50.4 |
| Total | 100 | 100 | 100 | 100 |

Comparative Examples 25 to 28

Preparation of Composition for a Biodegradable Starch Bowl

In these comparative examples 25 to 28, biodegradable compositions were prepared in the same manners and amounts as the comparative examples 17 to 20 except that stearamide, liquid paraffin and zinc stearate were used as the releasing agent instead of the mixture of magnesium stearate and monostearyl citrate, and amounts of the rutile phase $TiO_2$, each releasing agent and water were different from those of the comparative examples 17 to 20.

Table 9 shows each composition of the comparative examples 25 to 28.

TABLE 9

| Constituents | Comparative example 25 | Comparative example 26 | Comparative example 27 | Comparative example 28 |
|---|---|---|---|---|
| Natural polymer (corn starch) | 36.7 | 36.7 | 36.7 | 36.7 |
| Pulp fiber powder (broadleaf tree) | 9.9 | 9.9 | 9.9 | 9.9 |
| Rutile phase $TiO_2$ | 0.5 | 0.5 | 0.5 | 0.5 |
| Preservative (potassium sorbate) | 0.2 | 0.2 | 0.2 | 0.2 |
| Releasing agent (stearamide) | — | 2.0 | — | — |
| Releasing agent (liquid paraffin) | — | — | 2.0 | — |
| Releasing agent (Zn sterate) | — | — | — | 2.0 |
| Water | 52.7 | 50.7 | 50.7 | 50.7 |
| Total | 100 | 100 | 100 | 100 |

Experiment 1

Preparation of Starch Bowl and Evaluation of Physical Properties of the Prepared Bowl The compositions prepared according to the examples 1 to 16 and the comparative examples 17 to 28 were molded for 150 seconds in a heating and pressurizing mold having conditions of 180° C. and 3 kgf/cm² to produce bowl-shaped molded bodies.

Then, the bowl was positioned in a mold cavity having air vent holes.

Further, a biodegradable film was delivered to a heater section, which had been heated to 200° C. in advance, and then heated so as to be softened. Then, the softened film was positioned on an upper part of the bowl.

Then, the softened film was vacuum-sucked with 400 mmHg vacuum for 10 seconds through the air vent holes of the mold cavity so that it was closely attached to an inner surface of the bowl. In addition, the film was pressurized onto the inner surface of the bowl by injecting air having 4 kgf/cm² of pressure for 3 seconds through an air injector from an exterior so that it was closely attached to the inner surface of the bowl.

Then, the film around a lip part of the bowl was cut. A biodegradable starch bowl having the biodegradable film attached onto the inner surface thereof was obtained.

Evaluation of physical properties of the bowl was performed as follows.

At first, in the following results of a molding property, ⊚ indicates that a surface of the body is smooth and has no wrinkles or pinholes. ○ indicates that a surface of the body is relatively rough but has no wrinkles or pinholes. x indicates that a surface of the body has wrinkles or pinholes and molding is difficult.

Regarding a compressive strength, measured was a strength at the time of fracture of the bowl in case that both surfaces of the bowl were compressed using a load cell at a speed of 2 mm/s. In the following results, ⊚ indicates above 5 kg·m/s², ○ indicates 3~5 kg m/s², and x indicates below 3 kg·m/s².

Regarding a stench, ten (10) researchers checked whether there occurred a nasty smell from the bowl besides a peculiar smell of the starch. In the following results, N indicates 'there exists no stench' and Y indicates 'there exists stench'.

With regard to a color change, a color of the bowl was compared with that of a standard composition (corn starch 36.7%, fiber powder 9.9% and water 53.4%).

Regarding a sterilizing effect, a UV lamp was positioned in a reactor as shown in FIG. 9 and surrounded by a quartz tube. A sample of molded body of starch having a size of 50 mm×80 mm was put in the quartz tube and then *Escherichia coli* was made to pass through the tubes.

After that, light was irradiated with a 100 W UV lamp having a wavelength of 360 nm and then a removal rate of *Escherichia coli* was measured in the reactor after one hour.

Regarding a deodorizing effect, a UV lamp was positioned in a reactor as shown in FIG. 9 and surrounded by a quartz tube. A sample of molded body of starch having a size of 50 mm×80 mm was put in the quartz tube and then was made to pass through acetaldehyde having a concentration of 600 ppm diluted with air.

After that, light was irradiated with a 100 W UV lamp having a wavelength of 360 nm and then a decomposition efficiency of the acetaldehyde was measured in the reactor after one hour.

With regard to a long-term preservative property, the molded bodies prepared according to the examples 1 to 16 and the comparative examples 17 to 28 were put in a thermo-hydrostat having conditions of 30° C. and a relative humidity of 90%, and it was examined how much the bowl was contaminated with fungi. In the following results, x indicates that fungi occurred in 20 days, ○ indicates that fungi occurred in 21~30 days, and ⊚ indicates that fungi occurred in 31~90 days.

Regarding a releasing property, measured was the number of bowls which were attached to an upper mold and raised according to the elevation of the upper mold while not dropped onto a lower mold, when preparing 100 bowls using the compositions of the examples and the comparative examples. Tables 10 and 11 show that the less the number, the better the releasing property.

Table 10 shows the result of measurement of the molding property, the compressive strength, the stench, the color change, the sterilizing and deodorizing effect, the preservative and releasing properties in the examples 1 to 16.

TABLE 10

| Example | Molding property | Compressive strength | Stench | Color change | Sterilizing effect (removal rate of *Escherichia coli*) | Deodorizing effect (decomposition rate of acetaldehyde) | Preservative property | Releasing property (number) |
|---|---|---|---|---|---|---|---|---|
| 1 | ⊚ | ⊚ | N | N | 65% | 70% | ⊚ | 0 |
| 2 | ⊚ | ⊚ | N | N | 100% | 100% | ⊚ | 0 |
| 3 | ⊚ | ⊚ | N | N | 100% | 100% | ⊚ | 0 |

TABLE 10-continued

| Example | Molding property | Compressive strength | Stench | Color change | Sterilizing effect (removal rate of Escherichia coli) | Deodorizing effect (decomposition rate of acetaldehyde) | Preservative property | Releasing property (number) |
|---|---|---|---|---|---|---|---|---|
| 4 | ◎ | ◎ | N | N | 100% | 100% | ◎ | 0 |
| 5 | ◎ | ◎ | N | N | 75% | 85% | ◎ | 0 |
| 6 | ◎ | ◎ | N | N | 100% | 100% | ◎ | 0 |
| 7 | ◎ | ◎ | N | N | 100% | 100% | ◎ | 0 |
| 8 | ◎ | ◎ | N | N | 100% | 100% | ◎ | 0 |
| 9 | ◎ | ◎ | N | N | 100% | 100% | X | 0 |
| 10 | ◎ | ◎ | N | N | 100% | 100% | ○ | 0 |
| 11 | ◎ | ◎ | Y | Y | 100% | 100% | ◎ | 0 |
| 12 | ◎ | ◎ | Y | Y | 100% | 100% | ◎ | 0 |
| 13 | ◎ | ◎ | N | N | 100% | 100% | ◎ | 12 |
| 14 | ◎ | ◎ | N | N | 100% | 100% | ◎ | 12 |
| 15 | ◎ | ◎ | N | N | 100% | 100% | ◎ | 8 |
| 16 | ◎ | ◎ | N | N | 100% | 100% | ◎ | 8 |

Table 11 shows the result of measurement of the molding property, the compressive strength, the stench, the color change, the sterilizing and deodorizing effect, the preservative and releasing properties in the comparative examples 17 to 28.

Regarding the releasing property, the comparative example 25, which did not use the releasing agent, had a poor releasing property. The comparative example 26, which used stearamide as the releasing agent, generated nasty stench and exhibited a poor releasing property.

TABLE 11

| Comparative example | Molding property | Compressive strength | Stench | Color change | Sterilizing effect (removal rate of Escherichia coli) | Deodorizing effect (decomposition rate of acetaldehyde) | Preservative property | Releasing property (number) |
|---|---|---|---|---|---|---|---|---|
| 17 | ◎ | ◎ | N | N | 0% | 0% | ◎ | 0 |
| 18 | ◎ | ◎ | N | N | 0% | 0% | ◎ | 0 |
| 19 | ◎ | ◎ | N | N | 0% | 0% | ◎ | 0 |
| 20 | ◎ | ◎ | N | N | 0% | 0% | ◎ | 0 |
| 21 | ◎ | ◎ | N | N | 0% | 0% | X | 0 |
| 22 | ◎ | ◎ | N | N | 0% | 0% | X | 0 |
| 23 | ◎ | ◎ | N | N | 0% | 0% | ○ | 0 |
| 24 | ◎ | ◎ | Y | Y | 0% | 0% | ○ | 0 |
| 25 | ◎ | ◎ | N | N | 0% | 0% | ◎ | 100 |
| 26 | X | — | Y | N | 0% | 0% | X | 96 |
| 27 | ○ | ◎ | N | N | 0% | 0% | X | 82 |
| 28 | X | — | N | N | 0% | 0% | X | 56 |

As can be seen from Tables 10 and 11, the comparative examples 17 to 28, which used rutile phase $TiO_2$ as the photo catalyst, did not exhibit the sterilizing and deodorizing effects compared to the examples 1 to 16 which used $TiO_2$ wherein an anatase content is 70% or more or $Fe^{3+}$-doped $TiO_2$ as the photo catalyst.

On the other hand, it could be seen that the sterilizing and deodorizing effects were excellent when $TiO_2$ wherein an anatase content is 70% or more or $TiO_2$ doped with $Fe^{3+}$ were added in an amount of 0.5 wt. % or more. However, if such a expensive photo catalyst is added in an amount of 1 wt. % or more, the increase of the cost of the composition can be caused.

Further, in the comparative examples 21 to 24, which used sodium benzoate as the preservative, exhibited was a slight effect of inhibiting fungi compared to the comparative examples which used potassium sorbate as the preservative. When the preservative is added in an excessive amount of 0.5 wt. % or more, there occurs nasty stench and the color of the molded body becomes changed.

Accordingly, in the invention, preferred was the case that potassium sorbate as the preservative was added in an amount of 0.2 wt. %. In the case, as can be seen from the above results, stench and color change were prevented and fungi was inhibited excellently.

Since the liquid paraffin, which was used in the comparative example 27, has a high boiling point, the liquid paraffin inhibited the foaming rate of the molded body and also induced a poor molding property. In addition, the zinc stearate also induced the poor molding property and inhibited the foaming rate.

However, when magnesium stearate and monostearyl citrate were mixed in a weight ratio of 1.5:1 in the examples 13 to 16, it could be expected that the cost of the raw material is reduced due to the increase of the foaming rate, and it was possible to improve such a phenomenon that the paste is stuck on an inner wall of the agitator and to provide a gloss and an excellent releasing property to a surface of molded body.

Experiment 2

Test of Degradability in Soil

In this experiment, measured was a degradability in soil of the biodegradable starch bowl according to the invention used in the experiment 1 (humus was used).

FIG. 10 is a photograph showing an example of a bowl at an early stage of degradation in this experiment. FIG. 11 is a photograph showing an example of the bowl degraded after 20 days in this experiment. FIG. 12 is a photograph showing an example of the bowl degraded after 40 days in this experiment FIG. 13 is a photograph showing an example of the bowl degraded after 100 days in this experiment.

As can be seen from FIGS. 10 to 13, the biodegradable starch bowl according to the invention exhibited an excellent biodegradability after 100 days.

Experiment 3

Test of Water-Resistance

In this experiment, measured was a water-resistance of a bowl having a biodegradable film especially made of polylactic acid among the bowls prepared as described above in order to evaluate water-resistances of the prepared bowl.

The bowl was prepared as follows.

The composition of the example 2 was molded for 150 seconds in the heating and pressurizing mold having conditions of 180° C. and 3 kgf/cm², thereby providing a bowl-shaped molded body.

The biodegradable film was prepared as follows.

A film was prepared with a casting method using polylactic acid (PLA, glass transition temperature: 59° C., melting point: 175° C., flow index: 3.0 g/10 min.) which is a biodegradable resin. In general, the polylactic acid (PLA) is transparent and biodegradable and has a high strength and properties similar to those of polyester.

The biodegradable film was attached to an inner surface of the bowl as the experiment 1.

For measuring a water-resistance, a liquid for testing water-leakage (surfactant: 0.3%, blue ink: 0.1%, and water: 99.6%) was poured into the starch bowl (depth: 70 mm, capacity: 450 cc) and then it was checked for 30 minutes whether there occurred any water-leakage.

That is, it was checked for 30 minutes with naked eyes whether the blue liquid for testing water-leakage was leaked out at any outer parts of the bowl.

Table 12 shows results of the tests for bowls which are made of the composition of the example 2 and include biodegradable films having different thickness attached therein (100 bowls were made in the respective case of the film thickness).

TABLE 12

| | Film thickness | | | | |
|---|---|---|---|---|---|
| | No lamination | 50 μm | 80 μm | 100 μm | 130 μm | 150 μm |
| Evaluation on water-resistance | 100 | 24 | 5 | 0 | 0 | 0 |

\* Criterion of decision whether there occurs any water-leakage: 330 cc of liquid for testing water-leakage having a temperature of 100° C. was poured into the bowl, and the number of the bowls from which the blue liquid for testing water-leakage was leaked out was checked with naked eyes after 30 minutes elapsed.
\* Method for evaluating water-resistance: it was evaluated to be undesirable for commercialization if there occurred any water-leakage even in one bowl when observing the outer part of the bowl after the liquid for testing water-leakage was poured into the bowl and then 30 minutes elapsed.
\* Criterion of evaluation of water-resistance
good: water-leakage did not occur
poor: water-leakage occurred in one or more of bowls (undesirable to commercialize)

As can be seen from Table 12, the water-leakage could be prevented by attaching the film. In particular, it was possible to completely prevent the water-leakage when the film having a thickness of 100 μm or more was attached.

Further, even when such film is attached, it is required to choose a thickness of the film suitable in the point of economical property and usability.

Therefore, a preferable thickness of the film is 100–300 μm. When the thickness is below 100 μm, the content of the bowl leaks out because the film is thinly attached or torn. Further, when the thickness is above 300 μm, it can increase the production cost.

INDUSTRIAL APPLICABILITY

According to the present invention, there is provided a biodegradable starch bowl having improved sterilizing property, deodorizing property, preservative property, releasing property, water-resistance and being reinforced in its strength, and a method for preparing the same.

The invention claimed is:

1. A biodegradable starch bowl being prepared to have a desired shape by heating and pressurizing a composition for the biodegradable starch bowl comprising unmodified starch having of 20-60 wt. %; pulp fiber powder of 5-30 wt. %; a solvent of 30-60 wt. %; Fe(III) doped titanium dioxide of 0.5-2.0 wt. %; and potassium sorbate of more than 0.1 to less than 0.5 wt % based on the total amount of the composition; and a biodegradable film which has a thickness of 100-300 μm for water-resistance, wherein the biodegradable film is made of one or more selected from the group consisting of polybutylene succinate, polyethylene succinate, ester starch and cellulose acetate, for being attached to an inner surface of the bowl.

2. A method for preparing a biodegradable starch bowl comprising steps of: preparing a composition for a biodegradable starch bowl comprising unmodified starch of 20-60 wt. %; pulp fiber powder of 5-30 wt. %; a solvent of 30-60 wt. %; titanium dioxide for sterilizing and deodorizing in which an anatase content is 70% or more of 0.5-2.0 wt. %; and potassium sorbate of more than 0.1 to less than 0.5 wt % based on the total amount of the composition (S1); preparing a bowl having a desired shape by heating and pressurizing the composition (S2); heating a biodegradable film which has a thickness of 100-300 μm for water-resistance, made of one or more selected from the group consisting of polybutylene succinate, polyethylene succinate, ester starch and cellulose acetate so as to be softened (S3); and positioning the softened film on an upper part of the bowl and then pressurizing the film into the bowl with vacuum suction or air injection from an exterior, thereby attaching the film to an inner surface of the bowl (S4).

3. A biodegradable starch bowl being prepared to have a desired shape by heating and pressurizing a composition for the biodegradable starch bowl comprising unmodified starch of 20-60 wt %; pulp fiber powder of 5-30 wt %; a solvent of 30-60 wt %; titanium dioxide for sterilizing and deodorizing in which an anatase content is 70% or more of 0.5-2.0 wt %; and potassium sorbate of more than 0.1 to less than 0.5 wt % based on the total amount of the composition; and a biodegradable film which has a thickness of 100-300 μm for water-resistance, wherein the biodegradable film is made of one or more selected from the group consisting of polybutylene succinate, polyethylene succinate, polyglycolic acid, ester starch and cellulose acetate, for being attached to an inner surface of the bowl.

4. A biodegradable starch bowl being prepared to have a desired shape by heating and pressurizing a composition for the biodegradable starch bowl comprising unmodified starch of 20-60 wt %; pulp fiber powder of 5-30 wt %; a solvent of 30-60 wt %; Fe(III) doped titanium dioxide of 0.5-2.0 wt %; and sodium benzoate equal to or greater than 0.2 wt % and less than 0.5 wt %, based on the total amount of the composition; and a biodegradable film which has a thickness of 100-300 μm for water-resistance, wherein the biodegradable film is made of one or more selected from the group consisting of polybutylene succinate, polyethylene succinate, polyglycolic acid, ester starch and cellulose acetate, for being attached to an inner surface of the bowl.

5. A biodegradable starch bowl being prepared to have a desired shape by heating and pressurizing a composition for the biodegradable starch bowl comprising unmodified starch of 20-60 wt %; pulp fiber powder of 5-30 wt %; solvent of 30-60 wt %; titanium dioxide for sterilizing and deodorizing in which an anatase content is 70% or more of 0.5-2.0 wt %; and sodium benzoate equal to or greater than 0.2 wt % and less than 0.5 wt %, based on the total amount of the composition; and a biodegradable film which has a thickness of 100-300 μm for water-resistance, wherein the biodegradable film is made of one or more selected from the group consisting of polybutylene succinate, polyethylene succinate, polyglycolic acid, ester starch and cellulose acetate, for being attached to an inner surface of the bowl.

6. The biodegradable starch bowl according to any one of claims 1, 3, 4, or 5, wherein the unmodified starch is one or more selected from a group consisting of corn, wheat, rice, tapioca and sweet potato.

7. The biodegradable starch bowl according to any one of claims 1, 3, 4, or 5, wherein the pulp fiber powder has a fiber length of 10-200 μm.

8. The biodegradable starch bowl according to any one of claims 1, 3, 4, or 5, wherein the pulp fiber powder is made by crushing a broadleaf tree.

9. The biodegradable starch bowl according to any one of claims 1, 3, 4, or 5, further comprising a releasing agent of 0.5-5 wt %, wherein the releasing agent is a mixture of monostearyl citrate and magnesium stearate having the mixing ratio of 1:1.5 by weight.

10. The biodegradable starch bowl according to any one of claims 1, 3, 4, or 5, wherein the solvent is one or more selected from a group consisting of water, alcohol, alkaline aqueous solution and acidic aqueous solution.

11. The biodegradable starch bowl according to any one of claims 1, 3, 4, or 5, wherein the solvent is water.

12. A method for preparing a biodegradable starch bowl comprising steps of preparing a composition for a biodegradable starch bowl comprising starch of 20-60 wt %; pulp fiber powder of 5-30 wt %; solvent of 30-60 wt %; Fe(III) doped titanium dioxide of 0.5-2.0 wt %, and potassium sorbate of more than 0.1 to less than 0.5 wt % based on the total amount of the composition (S1); preparing a bowl having a desired shape by heating and pressurizing the composition (S2); heating a biodegradable film which has a thickness of 100-300 μm for water-resistance, the biodegradable film being made of one or more selected from the group consisting of polybutylene succinate, polyethylene succinate, polyglycolic acid, ester starch and cellulose acetate so as to be softened (S3); and positioning the softened film on an upper part of the bowl and then pressurizing the film into the bowl with vacuum suction or air injection from an exterior, thereby attaching the film to an inner surface of the bowl (S4).

13. A method for preparing a biodegradable starch bowl comprising steps of preparing a composition for a biodegradable starch bowl comprising unmodified starch of 20-60 wt %; pulp fiber powder of 5-30 wt %; solvent of 30-60 wt %; titanium dioxide for sterilizing and deodorizing in which an anatase content is 70% or more of 0.5-2.0 wt %; and sodium benzoate equal to or greater than 0.2 wt % and less than 0.5 wt %, based on the total amount of the composition (S1); preparing a bowl having a desired shape by heating and pressurizing the composition (S2); heating a biodegradable film which has a thickness of 100-300 μm for water-resistance, the biodegradable film being made of one or more selected from the group consisting of polybutylene succinate, polyethylene succinate, polyglycolic acid, ester starch and cellulose acetate so as to be softened (S3); and positioning the softened film on an upper part of the bowl and then pressurizing the film into the bowl with vacuum suction or air injection from an exterior, thereby attaching the film to an inner surface of the bowl (S4).

14. A method for preparing a biodegradable starch bowl comprising steps of preparing a composition for a biodegradable starch bowl comprising unmodified starch of 20-60 wt %; pulp fiber powder of 5-30 wt %; a solvent of 30-60 wt %; Fe(III) doped titanium dioxide of 0.5-2.0 wt %; and sodium benzoate equal to or greater than 0.2 wt % and less than 0.5 wt %, based on the total amount of the composition (S1); preparing a bowl having a desired shape by heating and pressurizing the composition (S2); heating a biodegradable film which has a thickness of 100-300 μm for water-resistance, the biodegradable film being made of one or more selected from the group consisting of polybutylene succinate, polyethylene succinate, polyglycolic acid, ester starch and cellulose acetate so as to be softened (S3); and positioning the softened film on an upper part of the bowl and then pressurizing the film into the bowl with vacuum suction or air injection from an exterior, thereby attaching the film to an inner surface of the bowl (S4).

15. The method for preparing a biodegradable starch bowl according to any one of claims 2, 12, 13, or 14, wherein the film is pressurized into the bowl with the air injection from an exterior and the vacuum-suction at the same time and thereby the film is attached to the inner surface of the bowl in the step of S4.

16. The method for preparing a biodegradable starch bowl according to any one of claims 2, 12, 13, or 14, wherein the unmodified starch being one or more selected from a group consisting of corn, wheat, rice, tapioca and sweet potato is used in the step of S1.

17. The method for preparing a biodegradable starch bowl according to any one of claims 2, 12, 13, or 14, wherein the pulp fiber powder having a fiber length of 10-200 μm is used in the step of S1.

18. The method for preparing a biodegradable starch bowl according to any one of claims 2, 12, 13, or 14, wherein the pulp fiber powder being made by crushing a broadleaf tree is used in the step of S1.

19. The method for preparing a biodegradable starch bowl according to any one of claims 2, 12, 13, or 14, further comprising a releasing agent in the step of S1, wherein the releasing agent being a mixture of monostearyl citrate and magnesium stearate having the mixing ratio of 1:1.5 by weight.

20. The method for preparing a biodegradable starch bowl according to any one of claims 2, 12, 13, or 14, wherein the solvent being one or more selected from a group consisting of water, alcohol, alkaline aqueous solution and acidic aqueous solution is used in the step of S1.

21. The method for preparing a biodegradable starch bowl according to any one of claims 2, 12, 13, or 14, wherein the solvent being water is used in the step of S1.

* * * * *